United States Patent

[11] 3,601,347

| [72] | Inventors | James W. Attwood;<br>Henry A. Podedworny, both of Wayne, Mich. |
|------|-----------|---|
| [21] | Appl. No. | 862,220 |
| [22] | Filed | Sept. 30, 1969 |
| [45] | Patented | Aug. 24, 1971 |
| [73] | Assignee | Unistrut Corporation<br>Wayne, Mich. |

[54] PERFORATED STRUT MEMBER
10 Claims, 15 Drawing Figs.

| [52] | U.S. Cl. | 248/242 |
|------|----------|---------|
| [51] | Int. Cl. | A47j 5/00 |
| [50] | Field of Search | 248/51, 73, 224, 243, 244, 247, 248 |

[56] References Cited
UNITED STATES PATENTS

| 768,295 | 8/1904 | Palfrey | 248/243 |
|---------|--------|---------|---------|
| 977,609 | 12/1910 | Freeman | 248/243 |
| 1,943,134 | 1/1934 | McKesson | 248/51 |
| 3,284,971 | 11/1966 | Attwood | 52/100 |

Primary Examiner—William H. Schultz
Attorney—Hauke, Gifford and Patalidis

ABSTRACT: A strut member for attachment to a surface or between surfaces and which has at least one longitudinally depressed mounting surface, with perforations within the recess at a plurality of spaced locations for attachment of fasteners, brackets or other support members. The strut member may be constructed of a variety of cross sections or shapes from a simple L-section to U-channels and polygonal shapes. The internal ridges on either side of the depression form flanges for the attachment of connecting elements and the like. In one form, the perforations are provided with knockouts which, when in place, substantially retain the original strength of the strut member.

PATENTED AUG24 1971

INVENTOR
HENRY A. PODEDWORNY
JAMES W. ATTWOOD
BY
Hauke Knaus Gifford & Patalidis
Attorneys

PERFORATED STRUT MEMBER

BACKGROUND OF THE INVENTION

1. Field of the Invention

The present invention relates in general to strut members adapted for the securement of supporting or fastening members at a plurality of selective locations therealong.

2. Description of the Prior Art

Strut members are known in the art which are provided along their length with a plurality of apertures or perforations in the supporting surface. They usually comprise a channel, angle, hat section, or other type member to be attached to other structure and which have a flat supporting surface perforated along its length, usually at equally spaced locations, to provide a plurality of selective attachment positions.

This type of structure is quite often deficient in that the apertures or the perforations are disposed within the plane of the supporting surface. By attachment of a load-supporting bracket or the like having securing means adapted for insertion through said perforations any load in addition to the nominal weight of the bracket or other attaching member will be directly transferred to the flat-supporting surface of the strut member immediately adjacent the apertures or perforations, which is relatively weak due to the presence of the perforations. Thus, any load applied to the brackets or the like tends to bend or nick the surface of the strut immediately adjacent the apertures or perforations causing a misaligned loose fit of the attachment members. After repeated use, that is, after repeated load applications, the apertures or perforations will be so worn out around the edges that they will not be able to be used any more.

Additionally, a problem in the case of components supported directly on the strut members is that these components, particularly insulated electrical cables and members made of other vulnerable material, can be damaged by the sharp edges of the apertures when supported directly on the flat supporting surface of the strut.

Strut members having a continuous longitudinal slot formed from internal flanges are thereby adapted for the attachment of components at varying selected positions along the slot, but without some form of crossbracing the strut as a whole has inherent weaknesses particularly when subjected to torsional stresses.

SUMMARY OF THE INVENTION

The essence of the present invention is the improved structure of a perforated strut member by which the disadvantages of conventional perforated strut members and longitudinally slotted strut members have been avoided, but which affords a means of aligning and securing connecting devices.

The improved structure comprises a longitudinal member which may have a variety of desired angular cross sections from a simple L-section to a polygonal section and which may be free standing as a column or be attached to a surface or beam member.

The primary feature of the invention is the provision of a longitudinal depression or recess along the length of the strut member on one side or on a plurality or all of the sides of the strut member if the strut member is of angular, channel, polygonal or the like cross section. The longitudinal depressions or recesses in the strut member are apertured or perforated at preferably closely spaced intervals for selective attachment of fasteners, brackets or other support means. In formation, the sides of the recess are in effect flanges inturned from the strut face, the internal edges in the vicinity of the perforations being thereby adaptable to many types of connecting devices.

The perforations in the strut member can be of the knockout type so that only those perforations which will be actually used need to be punched out, leaving the unused perforations closed and the strut member retaining substantially its original strength. Such knockouts are described in U.S. Pat. Nos. 3,094,197 and 3,284,971.

The strut member can be attached to any supporting surface, such as a wall, floor or ceiling, or within a cabinet or enclosure. Certain embodiments of the strut member disclosed herein are adapted to be attached to hangers or beams for overhead suspension or, when used as uprights, they can be locked to connecting members to form self-supporting shelf structures or the like.

The present struts have supporting surfaces adjacent the perforations, but located in a plane different than the plane in which the perforations are located with the sides of the depression and the transverse crossbracing connections between them providing the strength of a substantially solid section, to improve its load-carrying capacity. Substantially all of the load of the supported components is carried on strengthened full cross sections of the perforated strut, but not on the crossbracing which ties the sides of the recess together.

Further advantages of the present novel construction will become apparent or be specifically pointed out in the following detailed description.

BRIEF DESCRIPTION OF THE DRAWINGS

The drawings illustrate various embodiments of the present invention constructed in accordance with the principles disclosed herein.

FIG. 1 is a side illustration of an installation embodying the present invention in the form of a wall strut adapted for the support of shelf brackets or the like;

FIG. 14 shows an exemplary installation of an L-type strut utilized to support cables, conduits or the like.

DESCRIPTION OF THE PREFERRED EMBODIMENTS

Figure 1:
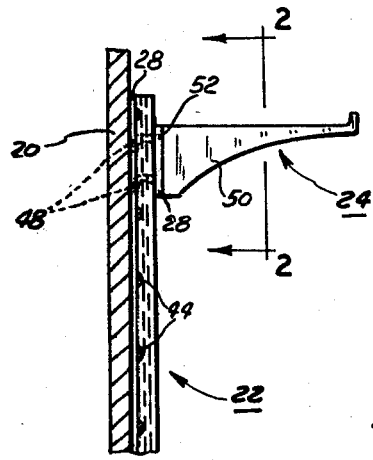
Figure 3:
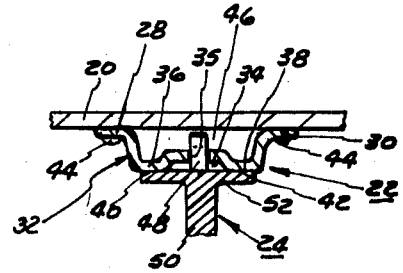
FIG. 3 is a cross section through the structure shown in FIGS. 1 and 2 as seen along line 3—3 in FIG. 2.
Figure 2:
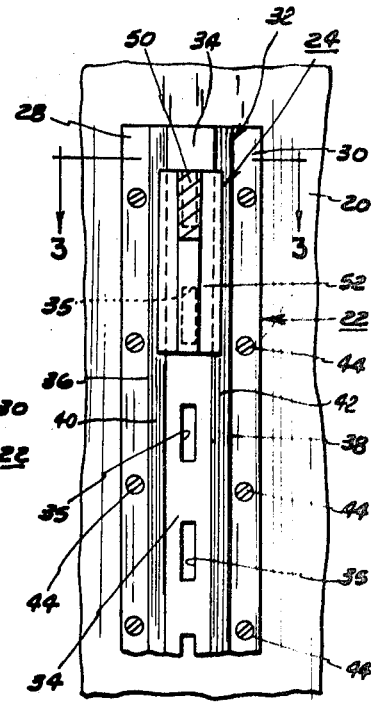
FIG. 2 is a front view of the structure shown in FIG. 1 as seen substantially from the line 2—2 thereof.

With reference now to FIGS. 1 to 3, there is shown a supporting surface such as a wall 20, to which is attached a strut 22 constructed in accordance with the present invention. The strut 22 in this configuration is utilized to support one or a plurality of brackets 24 which may be in the form of conventional shelf brackets as illustrated.

The strut 22 comprises a longitudinal channel member of hat-shaped cross section, as seen in FIG. 3, formed or rolled from a length of sheet material and having coplanar longitudinal side flanges 28 and 30 extending outwardly from a raised central portion 32 which is provided with a continuous longitudinal recess or depression 34. The depression 34 is provided with a plurality of spaced perforations 35 preferably along its entire length.

On installation, the strut member 22 is attached to the wall surface 20 so that the rear surfaces of the coplanar side flanges 28 and 30 abut against the wall 20 for securement thereto by means of fasteners 44 or by any other desired means such as an interlock, welding, brazing or the like, all of which are well known in the art. With the strut member 22 attached to the wall in this manner, the central portion 32 protrudes from the wall providing a space 46 between the rear of the depression 34 and the wall for the receipt of hooks 48 provided on the bracket 24.

The bracket 24, as in conventional practice, has an extending supporting portion 50 integral with or secured to a transverse flange portion 52 from the rear of which extend the attaching hooks 48, which are usually grouped in pairs and positioned in the same vertical plane.

In assembly, the hooks 48 of the bracket 24 are inserted trough adjacent perforations 35 for extension into the space 46 between the wall 20 and the rear of the depression 34, causing the flange portion 52 to abut squarely upon the coplanar flat surfaces 40 and 42 of the ridge portions 36 and 38 adjacent the sides of the longitudinal depression 34 as seen in FIG. 3. Thus, about one-half of the load placed on the supporting portion 50 of the bracket 24 will be transmitted to the substantially rigid ridge portions 36 and 38 of the strut member remote from and in a different plane than the perforations 35.

Figure 4:
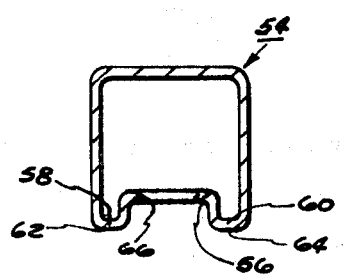
FIGS. 4 to 12 are cross sections of various modified embodiments of the present novel strut construction.

A strut member 54 illustrated in FIG. 4 comprises a tubular cross section of substantially rectangular form with a continuous longitudinal depression 56 provided on one side and defined by spaced longitudinal ridge portions 58 and 60 which have coplanar outer surfaces 62 and 64. The depression 56 is provided with a plurality of spaced perforations 66 for the attachment at selective locations of supporting members, connecting devices or the like. The strut member 54 can be attached to other structure along any of the three remaining flat sides, or it can be free-standing as a pillar or post if made sufficiently strong to provide a suitably rigid cross section.

Figure 5:
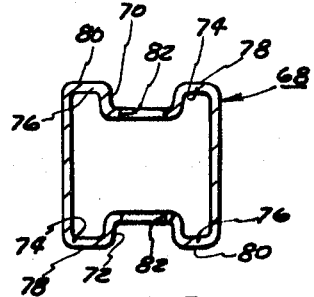

The embodiment in FIG. 5, similar to that in FIG. 4, likewise comprises a tubular cross section 68 of substantially rectangular form which, however, is provided along two opposite sides with continuous longitudinal depressions 70 and 72 defined by spaced longitudinal ridge portions 74 and 76, which have coplanar flat outer surfaces 78 and 80. Each of the depressions 70 and 72 is provided with a plurality of perforations 82, which preferably will be similarly spaced. The perforations 82 are provided for attachment at selected locations of supporting members, connecting devices or the like. The strut member 68 in FIG. 5 can be attached to other structure along any of its two remaining flat sides or it can be utilized in free-standing position as a column.

Figure 6:
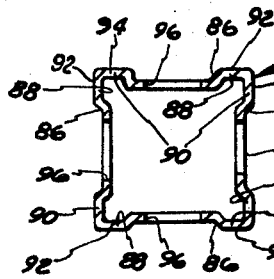

A strut member 84, illustrated in FIG. 6, comprises a tubular member of substantially rectangular cross section, which is provided with continuous longitudinal depressions 86 on all sides, each being defined by spaced longitudinal ridge portions 88 and 90 respectively. Each of the ridge portions 88 and 90 have coplanar flat outer surfaces 92 and 94, respectively, for the abutment of support members or the like thereagainst. Each of the longitudinal depressions 86 is provided with a plurality of perforations 96 which are preferably aligned with one another. The strut member 84 can be a free-standing column or it can be secured to a surface, a beam or the like along one side thereof through any of the provided perforations 96.

Figure 7:
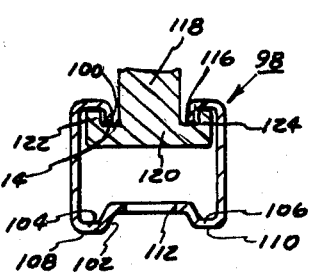

FIG. 7 illustrates a strut member 98 which comprises an open U-channel cross section providing a continuous longitudinal slot 100 along one side and a continuous longitudinal depression 102 along the opposite side. The depression 102 is formed between spaced longitudinal ridge portions 104 and 106 having coplanar flat outer surfaces 108 and 110, respectively, for the abutment of support members thereagainst. The longitudinal depression 102 is provided with a plurality of perforations 112 as in the other modifications. The slot opening 100 of the strut member 98 is provided with inwardly depressed longitudinal flanges 114 and 116 which provide a convenient means to hang the strut member from a supporting member 118, such as an I-beam or hanger for suspension from a ceiling or other overhead structure.

Figure 8:
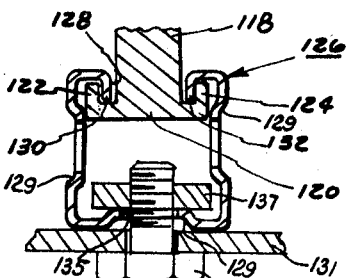

A strut member 126, illustrated in FIG. 8, is substantially similar to the strut member 98, shown in FIG. 7, provided along one side with a continuous longitudinal slot 128 but has continuous longitudinal depressions 129 on the other three sides. The slot 128 is likewise formed with inwardly directed longitudinal flanges 120 and 132 for locking engagement with the head portion 120 of the supporting member 118. A member 131 is supported on one side by a bolt 133 extending through the member 131 and through the perforation 135 provided in one continuous longitudinal depression and is threaded to a special nut 137, which is adapted to engage the edges of the depression as shown. This type of connection may be used with the other embodiments illustrated.

Figure 9:
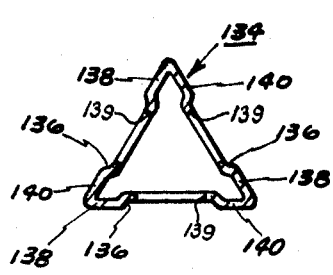

FIG. 9 illustrates a tubular strut member 134 having a triangular cross section, all sides of which are provided with continuous longitudinal depressions 136, each having a plurality of perforations 139. The load of a support member is applied on substantially rigid ridge portions 138 and 140 adjacent to the depressions 136. The ridge portions 138 and 140, in this instance, form the apexes of the triangular-shaped strut, which may be used for the securement and support of detachable components in a variety of selected positions along the strut.

Obviously, strut members of other polygonal shapes may be constructed for the support of detachable components to extend therefrom in various directions.

Figure 10:
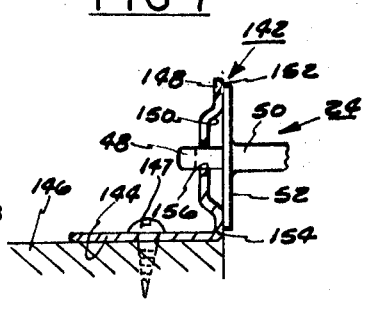

The embodiment in FIG. 10 shows an installation utilizing a strut member 142 of L-shaped cross section having a solid flange portion 144 for attachment by any means, such as screws 147, to a surface 146. The other flange portion 148 is provided with an inwardly directed continuous longitudinal depression 150 extending between spaced coplanar ridge portions' 152 and 154. The longitudinal depression 150 has a plurality of perforations 156 for the extension of the hooks 48 of the bracket 24 or the like therethrough in such manner that the flange portion 52 of the bracket will abut the coplanar ridge portions 152 and 154 for the support of the load sustained by the bracket 24, as previously described. This strut member may be secured in horizontal, vertical or any other desirable position.

Figure 11:
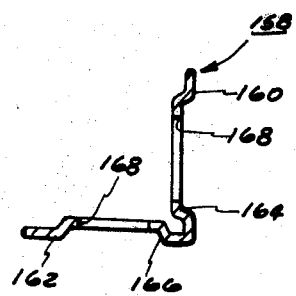

FIG. 11 illustrates a strut member 158 of L-shaped cross section similar to the strut member 142 of FIG. 10 with the exception that in this instance both flanges 160 and 162 are provided with inwardly directed continuous longitudinal depressions 164 and 166, respectively, each of which are provided with a plurality of perforations 168 for the attachment of fasteners, brackets or the like.

Figure 12:
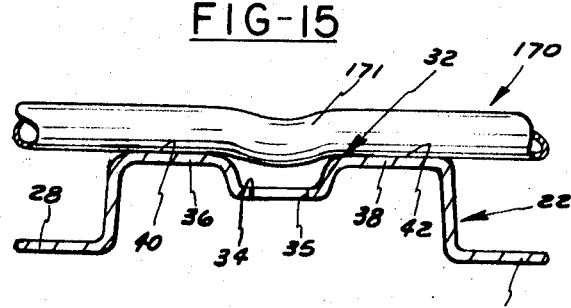

With reference to FIG. 12, a strut member 22 like that of FIGS. 1 to 3 but with broader ridges 36 and 38 is shown here as being utilized for the support of a cable 170 or the like. The strut member 22 may be supported on a flat surface or suspended overhead in cable trays and the perforations 35 along the depression 34 are used to secure the cable at spaced locations. The central depression 34 permits flexing of the cable, as shown at 171, without damage to the cable due to sharp edges with which the cable could otherwise come in contact, particularly around the perforations 35.

Figure 13:
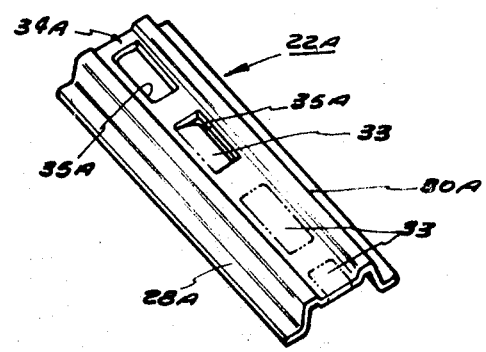
FIG. 13 is a perspective illustration of a strut substantially similar to the strut shown in FIG. 12 and provided with knockout perforations.

In FIG. 13, a strut member 22A is shown as provided with knockout perforations 35A within the continuous longitudinal depression 34A. This provision is of advantage in that only those selected perforations which are actually being used will be opened by punching the precut sections 33 out of the respective perforation with a drift pin or other hand tool, leaving the unused perforations closed to provide a substantially solid cross section between the used perforations, thus substantially retaining the strength of an unperforated strut. This provision may, of course, be utilized in all of the other strut members herein disclosed and described.

Figure 14:
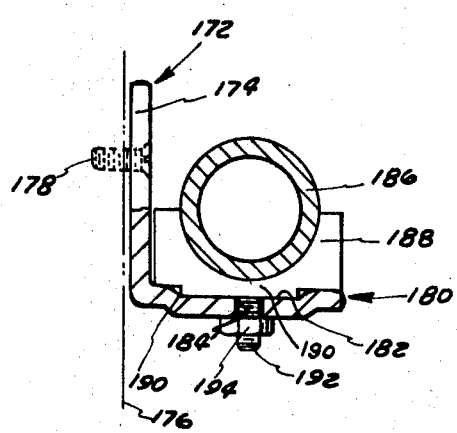

The assembly in FIG. 14 utilizes a strut member 172 of L-shaped cross section substantially similar to the embodiment shown in FIG. 10, having a solid unperforated flange portion 174 for attachment to a surface 176 by means of a fastener 178. The other flange 180 is provided with a continuous longitudinal outwardly directed depression 182 having a plurality of perforations 184. In the assembly shown in FIG. 14, the flange 180 is suspended away from the supporting surface 176 and is adapted to support a cable, conduit or the like 186 within a retainer block 188, which is provided with a longitudinal protrusion or ridge 190 adapted for extension into the depression 182. Conveniently, a threaded shank 192 may extend at designated intervals from the protrusion 190 for insertion through selected perforations 184 to secure the conduit retainer block 188 to the strut flange 180 by means of a nut 194 threaded onto the shank end 192.

Figure 15:
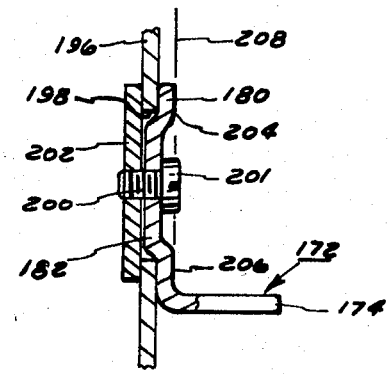
FIG. 15 illustrates the L-type strut shown in FIG. 14 utilized in a different manner as a wall support bracket.

In the assembly illustrated in FIG. 15, the same strut member 172 of FIG. 14 is used, but is shown here installed in a different manner. In this instance, the perforated flange 180 is used as the attachment means of the strut member to a supporting structure 196 or the like. The structure 196 is provided with a slot 198 adapted to receive the outwardly directed depression 182 of the strut flange 180 for flat abutment of the flange 180 against the structure 196. The perforations 184 can then conveniently be used to attach the strut member to the structure 196 by means of fasteners in the form of flat-headed screws 200 adapted to be threaded into retainer plates 202 on the other side of the structure 196. The flat head 201 of the screw 200, in assembly, does not protrude beyond the plane 208 of the coplanar ridge surfaces 204 and 206 adjacent to the depression 182, as indicated by the line 208, so that it will not interfere with any component being supported on the solid flange portion 174 extending away from the wall 196. Obviously, the supporting flange portion 174 may be provided with a perforated longitudinal depression as in the flange 180 extending either inwardly of the strut member, as illustrated in FIGS. 10 and 11, or outwardly as shown to facilitate the attachment of fasteners, brackets or the like thereto.

From the foregoing description, it will be apparent that a strut member has been provided for quick and convenient attachment and support of detachable or lockable support members, such as fasteners, brackets or the like, at desired selected locations along the strut member.

It is also apparent that the improved strut member can be used in a plurality of locations and positions, from vertical to horizontal.

The primary features of the improved strut member, however, is a depressed positioning of the perforations for locking attachment of the members to be supported on the strut by which the load of the supported members, plus the load carried by the supported members will be carried primarily by rigid or reinforced sections of the strut member in a plane separate from the plane in which the perforations are located so that the surfaces around the perforations will be prevented from being subjected to any excessive load stresses. In all cases, the edges which engage supported elements will be radiused to avoid damage.

The present invention may be embodied in certain other forms without departing from the spirit and essential characteristics thereof, therefore the present embodiments are to be considered in all respects as illustrative only and not restrictive, the scope of the invention being indicated by the appended claims rather than by the foregoing description.

We claim:

1. A perforated strut member comprising:
an elongated member of sheet material having a multilateral cross section;
means on at least one side of said strut member adapted for the support of at least one detachable element;
said means comprising a substantially planar longitudinal depression extending along said one side and a plurality of perforations located within a common plane along the length of said depression; and
said one side having substantially flat surfaced ridge portions on opposite sides of and adjacent said depression, the surfaces of said ridge portions being coplanar and located in a plane parallel to but spaced from the plane of said depression, the sheet material of said member being smoothly rounded at the edges joining said ridge portions and said depression.

2. The perforated strut member as defined in claim 1, in which said multilateral cross section is of U-channel type.

3. The perforated strut member as defined in claim 1, in which said multilateral cross section is in the form of a rectangle.

4. The perforated strut member as defined in claim 1, in which said multilateral cross section is in the form of a polygon.

5. The perforated strut member as defined in claim 1, in which said multilateral cross section is in the form of an L-member.

6. The perforated strut member as defined in claim 4, in which the polygonal shaped strut member is provided with a longitudinal slot along one side thereof having means for securing said strut member to a support member having complementary securing means.

7. The perforated strut member as defined in claim 6, in which said securing means comprise opposed flanges on said strut member and said support member adapted for interlocking engagement with each other.

8. The perforated strut member as defined in claim 1, in which said perforations are of the knockout type to substantially retain the original strength of the strut member where the knockouts remain in place.

9. The perforated strut member as defined in claim 1, in which all corners of said ridge portions are smoothly rounded.

10. The perforated strut member as defined in claim 1, in which said perforations are longitudinally elongated and have side edges parallel with and closely adjacent the sides of said depression.

UNITED STATES PATENT OFFICE
CERTIFICATE OF CORRECTION

Patent No. 3,601,347          Dated August 24, 1971

Inventor(s) James W. Attwood and Henry A. Podedworny (UCO-157-A)

It is certified that error appears in the above-identified patent and that said Letters Patent are hereby corrected as shown below:

IN THE SPECIFICATION:

Col. 2, line 75, change "trough" to --through--

Col. 3, line 68, change "120" to --130--

Signed and sealed this 4th day of April 1972.

(SEAL)
Attest:

EDWARD M. FLETCHER, JR.
Attesting Officer

ROBERT GOTTSCHALK
Commissioner of Patents